Figure 1:
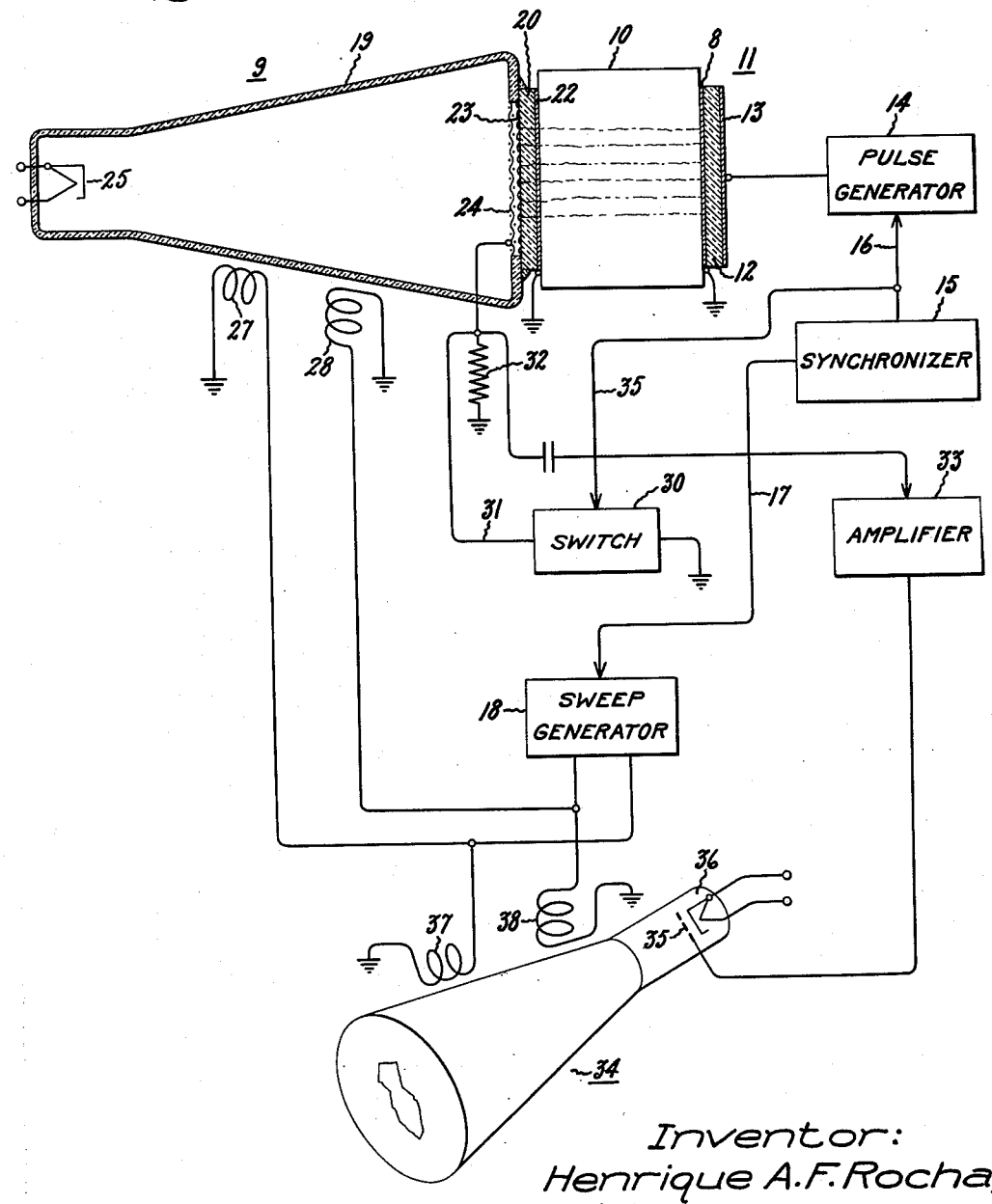

Oct. 25, 1960     H. A. F. ROCHA     2,957,340
ULTRASONIC IMAGE DETECTOR

Filed March 15, 1956     2 Sheets-Sheet 1

Inventor:
Henrique A. F. Rocha,
by *Merton D. Moore*
His Attorney.

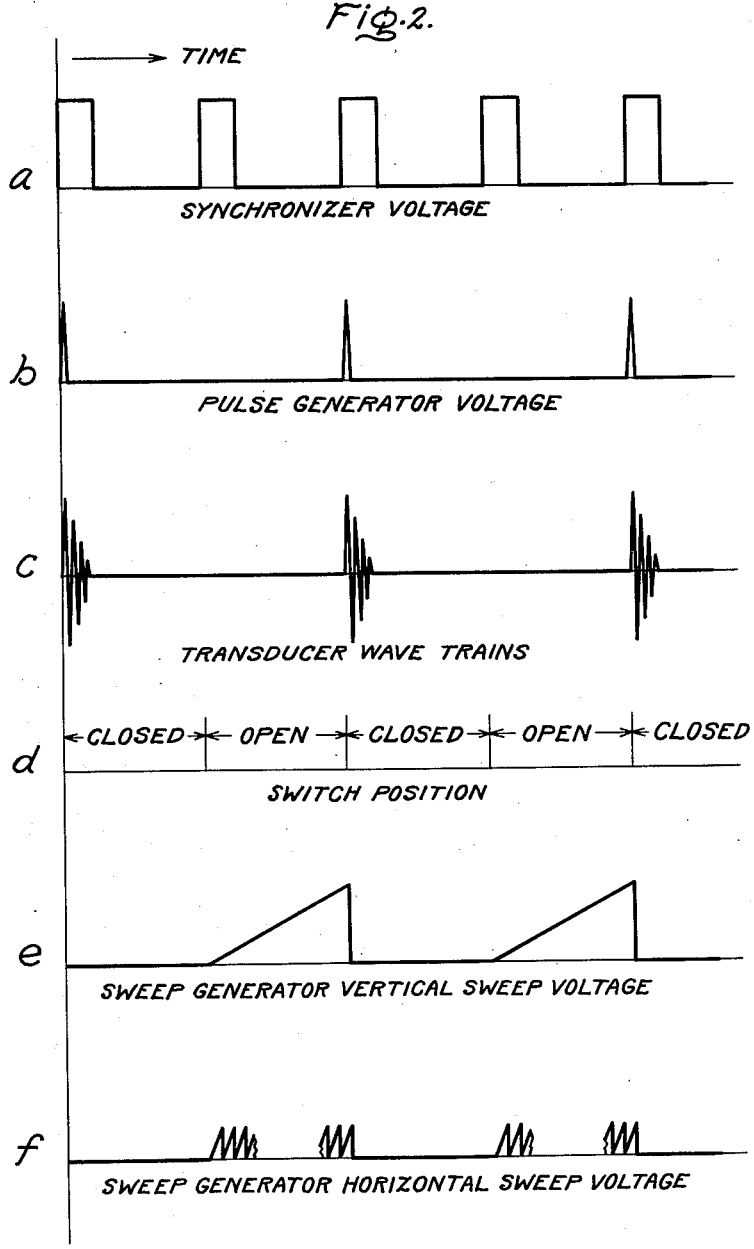

United States Patent Office 2,957,340
Patented Oct. 25, 1960

2,957,340
ULTRASONIC IMAGE DETECTOR
Henrique A. F. Rocha, Schenectady, N.Y., assignor to General Electric Company, a corporation of New York
Filed Mar. 15, 1956, Ser. No. 571,715
6 Claims. (Cl. 73—67.5)

This invention relates to ultrasonic testing and, more particularly, to an apparatus for detecting the size and shape of discontinuities in solid materials by the use of ultrasonic waves.

The main disadvantage in ultrasonic testing by the pulse reflection method is that a discontinuity in the material tested is displayed on the screen of a cathode ray tube as a "pip" which indicates that some part of the ultrasonic wave set up in the material was reflected before reaching the opposite wall. This procedure does not provide direct information regarding the size and shape of discontinuities occurring in the material.

In an effort to overcome this disadvantage, an ultrasonic testing method has been utilized which consists of displaying the shape of the defect in the material tested in an image detector consisting of a thin cell filled with a suspension of flat aluminum particles. This method of ultrasonic flaw detection suffers from the disadvantage that the detector cell is a continuous wave device with the inherent interference problems associated with these devices. A further disadvantage is that the detector cell is of low sensitivity and is not capable of producing amplification.

Another approach to the problem has been to attempt to take off charges from a piezoelectric crystal arranged to receive ultrasonic wave trains transmitted through the material to be tested and convert the charges into an image of inhomogeneities in the material inspected. It has been found that in order to obtain an undistorted image of the inhomogeneities in the material, it is necessary to scan the back surface of the crystal in such a manner as to pick off charges thereon at exactly the right instant in the wave train cycle due to the fact that the voltage generated by such crystals in response to ultrasonic waves is an alternating one. Thus it has been found that taking these charges off properly has been an almost insurmountable problem which prevents accurately obtaining information with regard to the size and shape of flaws within the material inspected.

Accordingly, one object of the present invention is to provide an apparatus for obtaining accurate information relating to the size and shape of defects occuring in a tested material.

Another object of this invention is to provide apparatus whereby the size and shape of a defect in a tested material may be visually displayed.

Another object of this invention is to provide apparatus of the character described which is capable of amplifying information obtained relating to the size and shape of a discontinuity in a material which is being inspected and producing a visual representation of the defect from the information obtained.

In accordance with this invention, ultra-acoustic wave trains are set up in a material to be tested, and means is provided for receiving the ultra-acoustic waves transmitted through the material to be tested, converting the transmitted ultra-acoustic wave trains into electrical energy, and subsequently converting this electrical energy into static charges which are proportional to the peak values of the ultra-acoustic wave trains transmitted through the material inspected. The static charges thus stored are then picked off and converted into electrical energy which may be amplified and supplied to a device whereby a visual image corresponding to the spatial distribution of the stored static charges may be supplied.

The novel features which are believed to be characteristic of this invention are set forth with particularity in the appended claims. The invention itself, both as to its organization and method of operation together with further objects and advantages thereof may best be understood by reference to the following description taken in connection with the accompanying drawings in which:

Fig. 1 is a diagrammatic and schematic drawing illustrating the circuitry and physical elements employed in a preferred embodiment of this invention; and Fig. 2 illustrates the wave forms utilized or generated by various circuit components and their time phase relationship.

Referring specifically to Fig. 1 of the drawings, the body 10 to be examined is subjected to sonic, ultrasonic, or other high frequency sound waves for the purpose of detecting flaws within the body or work piece 10 and obtaining information relating to the size and shape of such flaws. The waves themselves are produced by a transducer 11 which may consist of a conventional quartz crystal or barium titanate ceramic 12 having a conductive coating 13 in intimate contact with one surface for receiving electrical energy and a conductive coating 8 on its opposite surface which is intended to be in contact with the material to be inspected. It is to be understood that this contact between the conductive coating 8 and the work piece 10 is not limited to actual physical contact since in all probability a coupling such as a light film of oil, a liquid column, or other substance will be placed between the transducer and the material to be tested. This will also be true when the term "contact" is used with relation to transducers at other points in this description.

The transducer 11 may be energized from any suitable pulse or wave train generator 14, such as the one shown and described in U.S. Patent No. 2,280,226, granted to F. A. Firestone. The pulse generator 14 may be triggered by a conventional synchronizer 15 which for the present application is preferably one from which alternate output voltage pulses may be picked off and alternately supplied to two individual output circuits. One set of the output pulses is supplied through the lead line 16 to the pulse generator as previously indicated and the other set of output pulses is supplied through the lead 17 to a sweep generator 18, the function of which will be described in detail below. A common synchronizer of the type referred to is the simple astable or "free running" multivibrator which is illustrated and described in detail in almost any elementary electronic text. For example, a section is devoted to such multivibrators in the "Massachusetts Institute of Technology, Radiation Laboratory Series," vol. 19, McGraw-Hill Book Company, 1949.

The frequency at which the synchronizer triggers the pulse generator 14 is determined by the circuit constants and may be arranged to send ultrasonic wave trains through the material 10 which is being inspected at any desired interval. For example, the astable multivibrator may be made to have an output which can be adjusted between 50 and 1,000 cycles per second. The ultrasonic wave trains transmitted are illustrated in Fig. 2c.

In order to receive the sound wave transmitted through the material inspected and convert them into a form which may be utilized to present a visible image of flaws or inhomogeneities in the material inspected, a special storage tube 9 is provided. This storage tube is provided with an envelope 19 which is illustrated as being similar to the envelope of a conventional cathode ray tube with the exception that the front face of the tube consists of a transducer 20 which may be a conventional quartz or crystal barium titanate ceramic. The transducer 20 is provided with a grounded metallic coating 22 which is to be placed in contact with the face of the work piece 10 opposite the surface contacted by the transmitting transducer 11. Thus, the transmitted wave trains impinge upon the front face of the receiving transducer 20 and thereby produce an alternating voltage on each point on the back face of the receiving transducer 20 which corresponds to the intensity of the impinging ultrasonic energy on the corresponding point on the front face. Any charge thus produced on the back face of the receiving transducer 20 is an alternating charge which alternates with the alternating voltage set up thereon by the transmitted ultrasonic energy.

In order to utilize the alternating charge thus produced, the back face of the receiving transducer 20 is coated with a mosaic 23 of finely divided particles of a material which is a semiconductor, such as germanium or silicon. These particles are not in contact with each other and are oriented in the same manner, preferably with their negatively poled side in contact with the transducer so that they constitute elemental rectifying charge plates. The alternating voltages appearing on the back surface of the receiving transducer 20 are simultaneously rectified and converted into unidirectional static charges each of which has a magnitude which is a function of the peak voltage of the alternating voltage rectified. These unidirectional static charges are spatially distributed over the back face of the receiving transducer 20 and the pattern of intensity of the charges corresponds to the size and shape of flaws or inhomogeneities in the material inspected.

The remainder of the apparatus is designed to make the most effective use of the information contained on the mosaic of elemental rectifying charge plates 23. In order to do this, the storage tube 9 is also provided with a fine conducting mesh or screen 24 positioned inside the tube and a few thousandths of an inch away from the mosaic 23 so that, effectively, a plurality of elemental capacitors are provided with the finely divided elemental rectifying charge plates on the back face of the receiving transducer 20. Thus, a pulse of ultrasonic energy is transmitted through the material 10 being tested, hits a point on the front face of the receiving transducer 20, and the corresponding point on the back face develops an alternating voltage which is rectified and stored in the rectifier-condenser system. As a consequence, during the positive half cycles, each elemental condenser is charged to the peak voltage of the transducer 20 and stores the charge until discharged by some external means. As previously indicated, the charge on the elemental capacitors will vary in dependence upon the homogeneity of the material being tested.

The storage tube 9 is provided with an electron gun 25 to pick off or discharge the charges stored on the back face of the receiving transducer 20. The electron gun 25 may be any of the well known types which may be made to emit an electron beam by applying a voltage thereto. Horizontal and vertical deflection coils 27 and 28, respectively, are provided to determine the path of the electron beam from the gun 25. It will, of course, be recognized that electrostatic deflection plates may be used equally as well.

A sweep generator 18 is connected to energize the horizontal and vertical deflection coils 27 and 28 to cause the electron beam from the electron gun 25 to scan the front face of the storage tubes. As was previously indicated the synchronizer 15 which triggers the pulse generator 14 to set up ultrasonic waves in the material to be tested also supplies periodic pulses through the lead line 17 to the sweep generator which pulses alternate with the pulses supplied to the pulse generator. Thus, a triggering pulse is applied to the pulse generator 14 which causes information to be stored in the storage tube as previously described and then a triggering pulse is applied to the sweep generator 18 to set the sweep generator in operation and cause the stored charges on the front face of the storage tube 9 to be scanned. As a consequence, the charges are stored in the storage tube 9 and after such storage they are picked off or discharged by the beam from the electron gun 25.

The sequence of operation may be more clearly understood by reference to Fig. 2. The curve of Fig. 2a represents the output voltage wave from the synchronizer, with the first pulse being supplied to the pulse generator 14 (through lead 16), the second pulse being supplied to the sweep generator 18 (through lead 17), and subsequent output pulses being alternately supplied to these components. Thus, it will be seen from the pulse generator output voltage wave illustrated in Fig. 2b that the alternate output pulses from the synchronizer 15 trigger the pulse generator 14. The curves of Figs. 2e and 2f illustrate the vertical and horizontal sweep voltage supplied by the sweep generator 18 and show that the sweep generator 18 is triggered by the alternate output pulses from the synchronizer 15 which occur after the pulses which trigger the pulse generator 14.

It may also be seen from Figs. 2e and 2f that the electron beam is made to sweep the face of the tube horizontally a number of times for each vertical sweep. The number of horizontal scans or lines is determined by the number of pulses of horizontal sweep voltage (Fig. 2f). Each set of pulses of the horizontal sweep voltage is broken away in the center to indicate that the exact number of horizontal scanning lines is not important to this invention but may be varied to fit the particular circumstances. Actually, this number will be related to the image definition desired.

As previously indicated, the pulse generator 14 energizes transducer 11 to send ultrasonic wave trains through the object 10 being tested. Fig. 2c shows that these wave trains occur in time phase with the output pulses from the pulse generator 14 and therefore bear the same relationship in time to the output pulses from the sweep generator 18 as described with respect to pulses from the pulse generator 14.

In order to insure that a charge is not built up on the mesh or screen 24 in the storage tube while the charges are being stored on the elemental rectifier charge plate 23 and in order that no charge will remain on the mesh due to the action of the electron beam, the output pulses from the synchronizer 15 which triggers the pulse generator 14 is also supplied to an electronic switch 30 through the lead line 35 and connects the fine wire mesh to ground when the pulse generator 14 is triggered. The switch 30 is of such a construction that it will open the circuit to ground (through lead 31 and switch 30) while in its "off" or open condition. This "off" condition occurs when the sweep generator 18 is in operation and when the pulse generator 14 is not. This is illustrated by the open-closed diagram for the switch 30 of Fig. 2d. From Fig. 2 then, it may be seen that the switch 30 is closed to connect the wire mesh 24 to ground while wave trains are being transmitted through the object 10 being inspected, and open while the mosaic 23 on the front face of the storage tube 9 is scanned by the electron gun 25 so that the mesh 24 is connected through discharge resistor 32 to ground potential.

In other words, the electron beam from the electron gun is made to sweep across the wire mesh 24 and the mosaic of rectifying particles 23 similarly to television broadcasting standards and the ultrasonic pulse is applied by the pulse generator 14 during the vertical blanking period. Also during the vertical blanking period the wire mesh or screen 24 is connected directly to ground potential so that no charge will remain on the screen or be built up thereon. During the scanning period the electronic switch 30 is opened so that the wire mesh or screen 24 is connected to ground through a discharge resistor 32.

The electronic switch 30 may be any one of many well known types which will accomplish the functions set forth herein. For example, suitable circuits may be found in the book entitled "The Design of Switching Circuits" by Keister, Ritchie and Washburn, copyright 1951 by D. Van Nostrand Company, Inc. One such circuit may utilize the current flow in the cathode-anode circuit with the tube either fully conducting or completely cut off as described on page 203 (section 10.1) of this book.

As the electron beam scans the mosaic 23 on the back face of the receiving transducer 20, charge currents are caused to flow in the wire mesh 24 which currents are time varying in accordance with the stored charge pattern. As was previously stated the electronic switch 30 is open while the scanning operation is taking place and therefore the mesh 24 is connected to ground through the resistor 32. Consequently, the time varying output currents from the mesh 24 must flow through the resistor 32 causing a time varying voltage drop there-across. This time varying voltage drop varies in accordance with the charge pattern on the mosaic 23 on the back face of the transducer 20. The voltage drop across the resistor 32 is then used as the input voltage for an amplifier 33 of any well known type which may be used to amplify the time varying voltage across the resistor 32.

An indicator 34 which is preferably of a type which will give a visible indication of the size and shape of defects of the material inspected is connected to receive the output of the amplifier 33. The indicator 34 may be a cathode ray tube of a well known type, in which case the output of the amplifier 33 will be connected to the control grid 35 to modulate the electron beam of the tube emitted from electron gun 36. The output of the sweep generator 18 is also utilized to supply the sweep voltages for the horizontal and vertical deflection coils 37 and 38 of the indicator 34. Thus the indicator 34 is provided with horizontal and vertical sweep voltages from the sweep generator 18 and the electron beam is modulated in intensity by the output of the amplifier 33. In this manner a visual indication of any flaws or defects occurring in the material 10 which is being inspected will be indicated visibly upon the screen of the indicator device 34.

It will be recognized from the above description that the objects of this invention have been accomplished by providing an apparatus whereby the size and shape of flaws occuring in an inspected material may be visibly displayed in as much detail as necessary so that the exact nature of such flaws or defects may be accurately ascertained.

While a particular embodiment of this invention has been shown it will, of course, be understood that the invention is not limited thereto since modifications both in the circuit arrangement and in the instrumentalities employed may be made. It is contemplated that the appended claims will cover any such modifications as fall within the true spirit and scope of this invention.

What I claim as new and desire to secure by Letters Patent of the United States is:

1. Apparatus for detecting flaws in articles and producing a visible image of the flaws comprising means for transmitting ultra-acoustic sound wave trains through an article to be inspected, a storage tube for converting ultra-acoustic sound energy to electrical energy including an envelope having a piezoelectric transducer portion for receiving ultra-acoustic sound wave trains, said storage tube being positioned adjacent to the article being inspected so that said piezoelectric transducer portion receives the ultra-acoustic sound wave trains transmitted therethrough, a mosaic of finely divided discrete unidirectional conducting particles on the inner surface of said piezoelectric transducer portion whereby ultra-acoustic sound waves impinging on said piezoelectric transducer portion are converted into spatially distributed unidirectional static electric charges, a conductive mesh positioned substantially parallel to said mosaic within said envelope and spaced therefrom whereby a series of elemental capacitors is formed with the particles of said mosaic, and means to cause an electron beam to scan said mosaic whereby said elemental capacitors are sequentially discharged, electric circuit means connected to said conductive mesh to receive a time varying current caused by the discharge of said elemental capacitors, and means for utilizing said time varying current for producing a visual representation of inhomogeneities in the article inspected.

2. A storage tube for converting ultra-acoustic sound energy to electrical energy comprising an envelope having a piezoelectric transducer portion for receiving ultra-acoustic sound wave trains, a mosaic of finely divided discrete unidirectional conducting particles on the inner surface of said piezoelectric transducer portion whereby ultra-acoustic sound waves impinging on said piezoelectric transducer portion are converted into spatially distributed unidirection static electric charges, a conductive mesh positioned substantially parallel to said mosaic within said envelope and spaced therefrom whereby a series of elemental capacitors is formed with the particles of said mosaic, and means to cause an electron beam to scan said mosaic whereby said elemental capacitors are sequentially discharged.

3. Apparatus for detecting flaws in articles and producing a visible image of the flaws comprising means for periodically transmitting ultra-acoustic sound wave trains through an article to be inspected, a storage tube for converting ultra-acoustic sound energy to electrical energy including an envelope having a piezoelectric transducer portion for receiving ultra-acoustic sound wave trains, said storage tube being positioned adjacent to the article being inspected so that said piezoelectric transducer portion receives the ultra-acoustic sound wave transmitted therethrough, a mosaic of finely divided discrete unidirectional conducting particles on the inner surface of said piezolelectric transducer portion whereby ultra-acoustic sound waves impinging on said piezoelectric transducer portion are converted into spatially distributed unidirectional static electric charges, a conductive mesh positioned substantially parallel to said mosaic within said envelope and spaced therefrom whereby a series of elemental capacitors is formed with the particles of said mosaic, and means to cause an electron beam to scan said mosaic during the period between periodic ultra-acoustic sound wave trains whereby said elemental capacitors are sequentially discharged, electric circuit means connected to said conductive mesh to receive a time varying current caused by the discharge of said elemental capacitors, and means for utilizing said time varying current for producing a visual representation of inhomogeneities in the article inspected.

4. A storage tube for converting ultra-acoustic sound energy to electrical energy comprising an envelope having a piezoelectric crystal provided with an outer surface for receiving ultra-acoustic sound wave trains, a mosaic of finely divided discrete rectifier particles attached to the inner surface of said piezoelectric crystal within said envelope whereby ultra-acoustic sound waves impinging on said outer face are converted into spatially distributed unidirectional static electric charges within said envelope, a conductive mesh positioned within said envelope substantially parallel to said mosaic and spaced therefrom whereby a series of elemental capacitors is formed with the rectifier particles of said mosaic, and means to cause an electron beam to scan said mosaic whereby said elemental capacitors are sequentially discharged.

5. Apparatus for detecting flaws in articles and producing a visible image of the flaws comprising means for transmitting ultra-acoustic sound wave trains through an article to be inspected, a storage member for converting ultra-acoustic sound energy to electrical energy including a piezoelectric transducer portion for receiving ultra-acoustic sound wave trains, said storage member being positioned adjacent to the article being inspected so that said piezoelectric transducer portion receives the ultra-acoustic sound wave trains transmitted therethrough, a mosaic of finely divided discrete unidirectional conducting particles on the inner surface of said piezoelectric transducer portion whereby ultra-acoustic sound waves impinging on said piezoelectric transducer portion are converted into spatially distributed unidirectional static electric charges, a conductive member positioned adjacent to said mosaic to form with the particles thereof a series of elemental capacitors, and means sequentially to discharge said elemental capacitors, electric circuit means connected to said conductive member to receive a time varying current caused by the discharge of said elemental capacitors, and means for utilizing said time varying current for producing a visual representation of inhomogeneities in the article inspected.

6. Apparatus for detecting flaws in articles and producing a visible image of the flaws comprising means for periodically transmitting ultra-acoustic sound wave trains through an article to be inspected, a storage member for converting ultra-acoustic sound energy to electrical energy including a piezoelectric transducer portion for receiving ultra-acoustic sound wave trains, said storage member being positioned adjacent to the article being inspected so that said piezoelectric transducer portion receives the ultra-acoustic sound wave trains transmitted therethrough, a mosaic of finely divided discrete unidirectional conducting particles on the inner surface of said piezoelectric transducer portion whereby ultra-acoustic sound waves impinging on said piezoelectric transducer portion are converted into spatially distributed unidirectional static electric charges, a conductive member positioned adjacent to said mosaic to form with the particles thereof a series of element capacitors, and means sequentially to discharge said elemental capacitors during the period between periodic ultra-acoustic sound wave trains, electric circuit means connected to said conductive member to receive a time varying current caused by the discharge of said elemental capacitors, and means for utilizing said time varying current for producing a visual representation of inhomogeneities in the article inspected.

References Cited in the file of this patent

UNITED STATES PATENTS

| 2,164,125 | Sokoloff | June 27, 1939 |
| 2,528,725 | Rines | Nov. 7, 1950 |
| 2,610,245 | Rines | Sept. 9, 1952 |
| 2,696,522 | Rines | Dec. 7, 1954 |
| 2,700,895 | Carlson | Feb. 1, 1955 |
| 2,821,643 | Morton | Jan. 28, 1958 |